United States Patent
Liu et al.

(10) Patent No.: US 11,128,406 B2
(45) Date of Patent: Sep. 21, 2021

(54) DATA TRANSMISSION METHOD, DATA RECEIVING METHOD, USER EQUIPMENT AND BASE STATION

(71) Applicant: NTT DOCOMO, INC., Tokyo (JP)

(72) Inventors: Jiahui Liu, Beijing (CN); Qin Mu, Beijing (CN); Liu Liu, Beijing (CN); Huiling Jiang, Beijing (CN); Lan Chen, Beijing (CN); Naoto Okubo, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 100 days.

(21) Appl. No.: 16/496,240

(22) PCT Filed: Mar. 7, 2018

(86) PCT No.: PCT/CN2018/078265
§ 371 (c)(1),
(2) Date: Sep. 20, 2019

(87) PCT Pub. No.: WO2018/171427
PCT Pub. Date: Sep. 27, 2018

(65) Prior Publication Data
US 2020/0195383 A1 Jun. 18, 2020

(30) Foreign Application Priority Data
Mar. 23, 2017 (CN) .......................... 201710179453.9

(51) Int. Cl.
*H04L 1/16* (2006.01)
*H04W 52/02* (2009.01)
*G16Y 30/00* (2020.01)

(52) U.S. Cl.
CPC ....... *H04L 1/1671* (2013.01); *H04W 52/0225* (2013.01); *G16Y 30/00* (2020.01)

(58) Field of Classification Search
CPC . H04L 1/1835; H04L 41/0803; H04L 1/1812; H04W 52/52; H04W 76/11; H04W 52/241
See application file for complete search history.

(56) References Cited

U.S. PATENT DOCUMENTS

| 6,611,495 B1 | 8/2003 | Meyer et al. |
| 2011/0141991 A1 | 6/2011 | Gao |

(Continued)

FOREIGN PATENT DOCUMENTS

| CN | 101277176 A | 10/2008 |
| CN | 101651528 A | 2/2010 |
| CN | 106452688 A | 2/2017 |

OTHER PUBLICATIONS

International Search Report from counterpart application PCT/CN2018/078265, dated May 28, 2018.

(Continued)

*Primary Examiner* — Iqbal Zaidi
(74) *Attorney, Agent, or Firm* — Osha Bergman Watanabe & Burton LLP

(57) ABSTRACT

This application provides data transmitting method, a data receiving method, a user equipment, and a base station, which can realize early acknowledgment of uplink data reception. The data transmitting method for a user equipment includes: transmitting uplink data to a base station with an initial retransmission times; determining, within a predetermined interval, whether an acknowledged signal of the uplink data is received from the base station, wherein in the case where the acknowledged signal is received within the predetermined interval, transmission of the uplink data is stopped; and in the case where the acknowledged signal is not received within the predetermined interval, the uplink data is transmitted to the base station in a subsequent (Continued)

retransmission mode, until the acknowledged signal is received from the base station or a maximum retransmission times is reached.

19 Claims, 12 Drawing Sheets

(56) References Cited

U.S. PATENT DOCUMENTS

| | | |
|---|---|---|
| 2012/0039200 A1 | 2/2012 | Lee et al. |
| 2018/0139774 A1* | 5/2018 | Ma .................... H04L 1/189 |
| 2018/0199376 A1* | 7/2018 | Kim ................ H04W 74/0808 |
| 2020/0052835 A1* | 2/2020 | Xiong ................ H04L 1/1861 |

OTHER PUBLICATIONS

International Preliminary Report on Patentability from counterpart application PCT/CN2018/078265, including the English translation of the Written Opinion, dated Sep. 24, 2019.

\* cited by examiner

| Maximum retransmission times: N | Interval mode: configuration 1 (equal structure) | Interval mode: configuration 2 (descending structure) |
|---|---|---|
| 1 | 1 ||
| 4 | 4 ||
| 8 | 4,4 | 4,4 |
| 16 | 4,4,4,4 | 8,4,4 |
| 32 | 4,4,4,4,4,4,4,4 | 16,8,8 |

FIG. 6

| Maximum retransmission times N | Initial retransmission times |
|---|---|
| N<=4 | Using the maximum retransmission times N |
| N>4 | N/2 |

| n | bits | Configuration 1 $(N/2^{(n-1)})$ | Configuration 2 $(N/n)$ | Configuration 3 $(N/2^{(n)})$ | Configuration 4 $[N\log_2(n+1/n)]$ | ... |
|---|------|------|------|------|------|---|
| 1 | 00 | N | N/4 | N/2 | $[N^*\log_2 3/1]$ | |
| 2 | 01 | N/2 | N/2 | N/4 | $[N^*\log_2 3/2]$ | |
| 3 | 10 | N/4 | 3N/4 | N/8 | $[N^*\log_2 4/3]$ | |
| 4 | 11 | N/8 | N | N/16 | $[N^*\log_2 5/4]$ | |

FIG. 10

| Set of reexamination times | Reexamination times estimated by the user equipment | Reexamination times indicated in the uplink grant signal | Reexamination times selected by the user equipment |
|---|---|---|---|
| 1 | 1 | 1 | 1 |
| 4 | 2~4 | 4 | 4 |
| 8 | 4~8 | 8 | 4 |
| 16 | 8~16 | 16 | 8 |
| 32 | 16~32 | 32 | 16 |

FIG. 11

DATA TRANSMISSION METHOD, DATA RECEIVING METHOD, USER EQUIPMENT AND BASE STATION

CROSS-REFERENCE TO RELATED APPLICATIONS

This patent application is a 371 U.S. National Phase of International Application No. PCT/CN2018/078265, filed on Mar. 7, 2018, which claims priority to Chinese Patent Application No. 201710179453.9 filed on Mar. 23, 2017. The entire disclosures of the above applications are incorporated herein by reference.

TECHNICAL FIELD

The present application relates to the field of mobile communication technique, and more particularly, to a data transmitting method, a data receiving method, a user equipment, and a base station, which can realize early acknowledgment of uplink data reception.

BACKGROUND

With the development of the mobile communication industry and the growing demand for mobile data services, people are increasingly demanding on the speed and quality of service (Qos) of mobile communication. Currently, the 5G mobile communication technology standards for network diversification, broadband, integration, and intelligence are being developed and applied. From the perspective of different information interaction objects, division of the future 5G applications will cover three types of scenarios: enhanced mobile broadband (eMBB), massive machine-type communication (mMTC) and ultra-reliable low-latency (URLLC), wherein 5G-based mMTC can be implemented by eMTC and NB-IoT evolution.

In an IoT (Internet of Things) application scenario such as eMTC, it is desirable to realize a massive connection between people and objects, as well as between objects and objects, improve network coverage and resource efficiency, and save power consumption of user equipment. In Rel-13, it is proposed to apply uplink data retransmission to improve network coverage. For example, a set of uplink data retransmission times may be defined as: {1, 4, 8, 16, 32 . . . 2048}. For a maximum retransmission times 16 as indicated by Radio Resource Control (RRC), the retransmission times for a particular User Equipment (UE) may be set to {1, 4, 8, 16}.

In order to realize the early acknowledgement of uplink data reception in the IoT application scenario, a straightforward method is to reduce the granularity of the set of retransmission times, for example, the set of retransmission times may be defined as: {1, 2, 3, 4, . . . 32}. However, such ideal configuration of the granularity of the set of retransmission times will result in an increase in the overhead of downlink control information (DCI), and a channel quality indication (CQI) quantity cannot support this fine granularity configuration. Further, in the URLLC scenario, an early acknowledgment scheme is proposed in which the user equipment 20 detects acknowledgment feedback (ACK) from the base station 10 while transmitting uplink data to the base station 10. For example, in the scenario shown in FIG. 2A, the estimated retransmission times is 16 times, the user equipment 20 detects the acknowledgment feedback from the base station 10 after the 10th retransmission, then the user equipment 20 stops retransmission, there is no need to perform the remaining 6 times of retransmission.

However, for the user equipment in the half-duplex mode in the IoT scenario, it is impossible to apply the scheme that the user equipment in the full-duplex mode detects the acknowledgment feedback from the base station while transmitting data in the URLLC scenario. FIG. 2B shows that the user equipment in the half-duplex mode cannot simultaneously transmit and receive signals, so it can receive the acknowledgement feedback from the base station only after performing the predetermined times of retransmission. For example, for the user equipment 201 in a good coverage state, it needs to perform 4 times of retransmission, and for the user equipment 202 in a bad coverage state, it needs to perform 8 times of retransmission before receiving HARQ feedback from the base station. In fact, the user equipment 201 may have made successfully transmission without the 4 times of retransmission, and the user equipment 202 may made successfully transmission without the 8 times of retransmission. As such, unnecessary retransmission and lags in the acknowledgment result in wasted power consumption. Furthermore, even for the user equipment in full-duplex mode in an IoT scenario, it would require extremely high power consumption for the user equipment to detect acknowledgment feedback from the base station after each retransmission.

SUMMARY

In view of the above problem, the present application provides a data transmitting method, a data receiving method, a user equipment, and a base station.

According to an embodiment of the present application, there is provided a data transmitting method for a user equipment, comprising: transmitting uplink data to a base station with an initial retransmission times; determining, within a predetermined interval, whether an acknowledged signal of the uplink data is received from the base station, wherein in the case where the acknowledged signal is received within the predetermined interval, transmission of the uplink data is stopped; and in the case where the acknowledged signal is not received within the predetermined interval, the uplink data is transmitted to the base station in a subsequent retransmission mode, until the acknowledged signal is received from the base station or a maximum retransmission times is reached.

According to another embodiment of the present application, there is provided a data receiving method for a base station, comprising: receiving uplink data transmitted from a user equipment with an initial retransmission times; determining, within a predetermined interval, whether the uplink data is received correctly from the user equipment, in the case where it is determined that the uplink data is correctly received, transmitting an acknowledged signal to the user equipment.

According to another embodiment of the present application, there is provided a user equipment, comprising: a receiving unit, configured to receive a signal from a base station; a transmitting unit, configured to transmit uplink data to the base station with an initial retransmission times; and a retransmission control unit, configured to determine, within a predetermined interval, whether an acknowledged signal of the uplink data is received from the base station, wherein in the case where the acknowledged signal is received within the predetermined interval, the retransmission control unit controls the transmitting unit to stop transmission of the uplink data; and in the case where the acknowledged signal is not received within the predetermined interval, the retransmission control unit controls the transmitting unit to transmit the uplink data to the base station in a subsequent retransmission mode, until the acknowledged signal is received from the base station or a maximum retransmission times is reached.

According to another embodiment of the present application, there is provided a base station, comprising: a transmitting unit, configured to transmit a signal to a user equipment; a receiving unit, configured to receive uplink data transmitted from the user equipment with an initial retransmission times; and a receiving control unit, configured to determine, within a predetermined interval, whether the uplink data is received correctly from the user equipment, in the case where it is determined that the uplink data is correctly received, the receiving control unit controls the transmitting unit to transmit an acknowledged signal to the user equipment.

The data transmitting method, the data receiving method, the user equipment, and the base station according to the embodiments of the present application can, by means of inserting an interval for detecting HARQ feedback from the base station in the large uplink data retransmission times, implement early acknowledgement of uplink data reception without fully performing the maximum times of retransmission that is designated or estimated in advance, thereby saving power consumption of user equipment, improving resource utilization efficiency, and improving scheduling flexibility.

It is to be understood that both the foregoing general descriptions and the following detailed descriptions are exemplary and intended to provide further explanations of the claimed technique.

BRIEF DESCRIPTION OF THE DRAWINGS

Through the more detailed description of embodiments of the present application with reference to the accompanying drawings, the above and other objectives, features, and advantages of the present application will become more apparent. The drawings are to provide further understanding for the embodiments of the present application and constitute a portion of the specification, and are intended to interpret the present application together with the embodiments, rather than to limit the present application. In the drawings, the same reference sign generally refers to the same component or step.

FIG. 6 is a schematic diagram illustrating configuration of a retransmission mode in a data transmitting method for a user equipment according to an embodiment of the present application;

FIG. 10 is a schematic diagram illustrating configuration of a subsequent retransmission times in a data transmitting method for a user equipment according to an embodiment of the present application;

FIG. 11 is another schematic diagram illustrating configuration of a retransmission mode in a data transmitting method for a user equipment according to an embodiment of the present application;

DETAILED DESCRIPTION OF THE EMBODIMENTS

To make the objectives, technical solutions, and advantages of the present application more clear, exemplary embodiments of the present application will be described in detail with reference to the accompanying drawings. Obviously, the described embodiments merely are only part of the embodiments of the present application, rather than all of the embodiments of the present application, it should be understood that the present application is not limited to the exemplary embodiments described herein. All other embodiments obtained by those skilled in the art without paying inventive efforts should fall into the protection scope of the present application.

Figure 1:
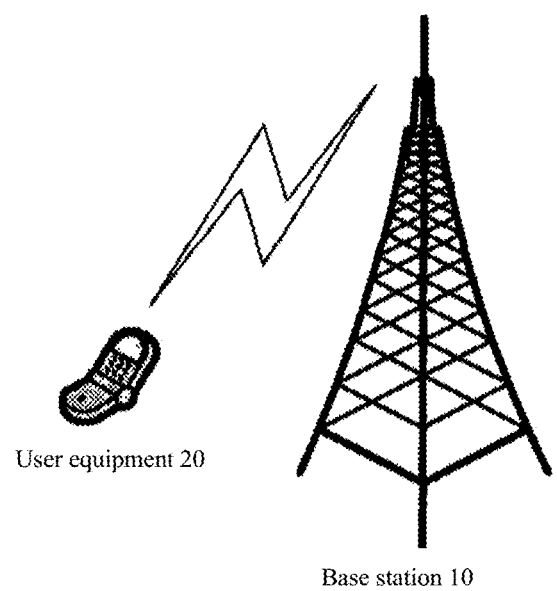
FIG. 1 is a schematic diagram outlining a communication system according to an embodiment of the present application.
Figure 2A:
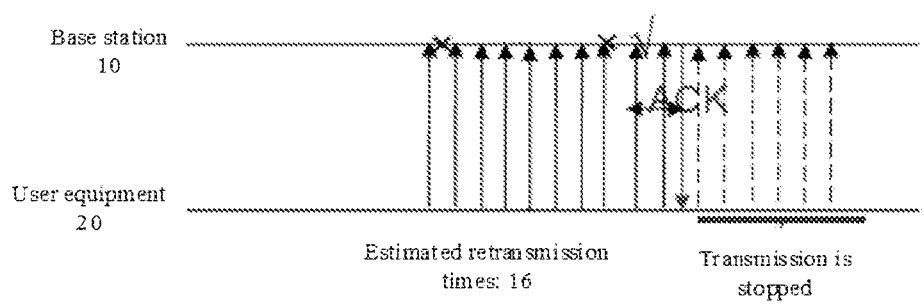
FIGS. 2A and 2B are diagrams illustrating acknowledgment process of uplink data in the full-duplex and half-duplex modes in the prior art.
Figure 2B:
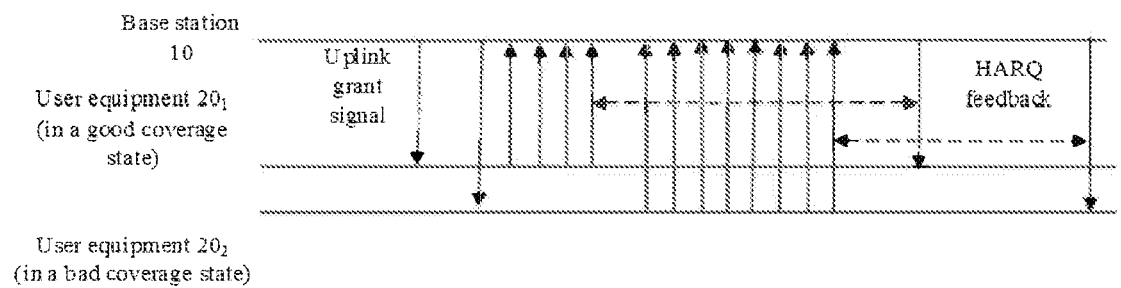

FIG. 1 is a schematic diagram outlining a communication system according to an embodiment of the present application. As shown in FIG. 1, the communication system according to an embodiment of the present application comprises a base station (eNB) 10 and a user equipment (UE) 20. The base station 10 and the user equipment 20 perform transmission and reception of communication signals based on a predetermined protocol over a predetermined communication channel.

The present application can be applied to a 5G-based IoT application scenario. In order to meet the requirements of low power consumption, high resource utilization, and flexible scheduling of user equipment in this application scenario, it is desirable to achieve early acknowledgement of uplink data reception.

First, a first example of a data transmitting method for a user equipment according to an embodiment of the present application will be described with reference to FIGS. 3 through 6. In the first example of a data transmitting method for a user equipment according to an embodiment of the present application, fixed retransmission is performed in a predetermined interval mode by using a different retransmission granularity.

Figure 3:
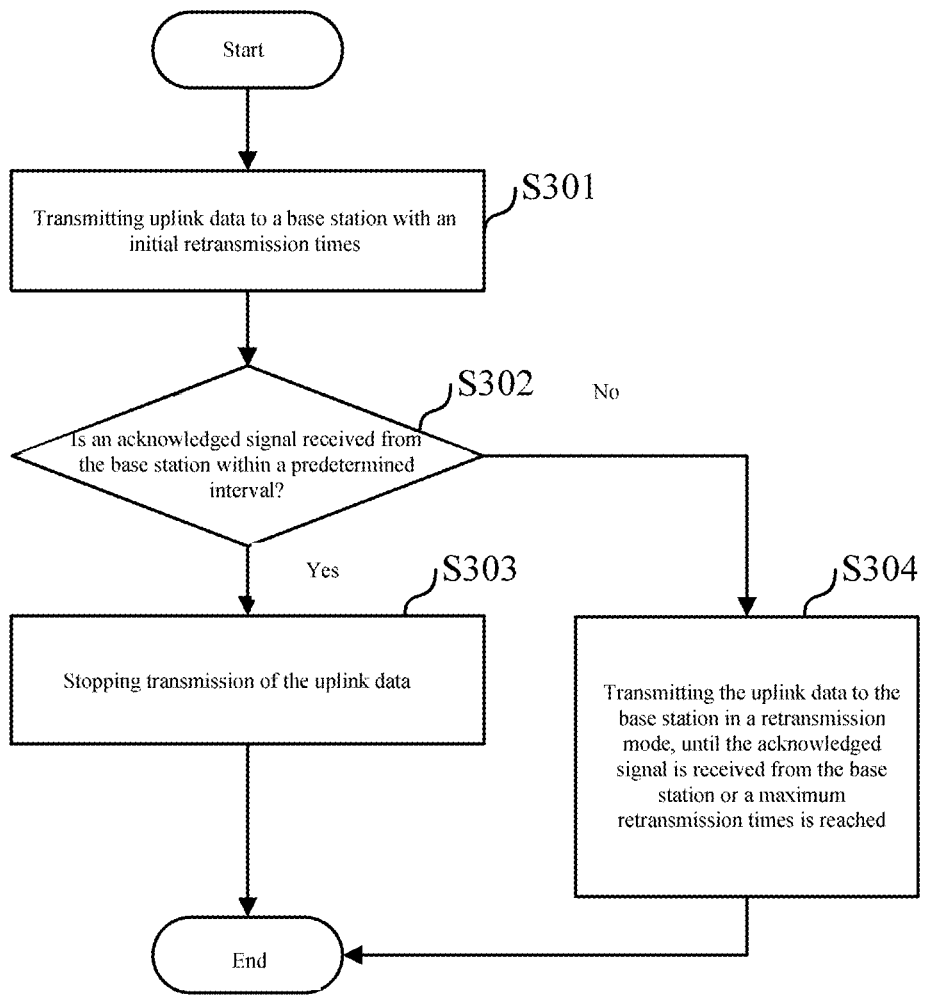
FIG. 3 is a first exemplary flowchart illustrating a data transmitting method for a user equipment according to an embodiment of the present application.

FIG. 3 is a first exemplary flowchart illustrating a data transmitting method for a user equipment according to an embodiment of the present application. As shown in FIG. 3, the first example of a data transmitting method for a user equipment according to an embodiment of the present application comprises the following steps.

In step S301, uplink data is transmitted to a base station with an initial retransmission times.

It is easy to understand that before the user equipment transmits uplink data to the base station with the initial retransmission times, the user equipment needs to know the maximum retransmission times of its uplink data. In an embodiment of the present application, the maximum retransmission times includes, but not limited to, the following two determining manners. In a first determining mode, before the user equipment transmits the uplink data to the base station, an uplink grant signal (UL grant) is first received from the base station, the base station indicates the maximum retransmission times of the uplink data to the user equipment in the uplink grant signal. In a second determining manner, in a situation where the user equipment can transmit uplink data to the base station without receiving an uplink grant signal, the user equipment determines the maximum retransmission times based on a measurement result of communication with the base station. For example, the user equipment determines the maximum retransmission times based on reference signal received power (RSRP) and/or reference signal received quality (RSRQ) of communication with the current base station. That is, the worse the communication coverage indicated by RSRP/RSRQ is, the greater the determined maximum retransmission times is, and vice versa. In addition, it is to be noted that the maximum retransmission times may be the number of times in the set of retransmission times {1, 4, 8, 16, 32 . . . 2048}.

Thereafter, the processing proceeds to step S302.

In step S302, it is determined, within a predetermined interval, whether an acknowledged signal of the uplink data is received from the base station. In an embodiment of the present application, a parameter related to the predetermined interval needs to be defined in advance. Specifically, a length of the predetermined interval corresponds the time (for example, 3 ms) required by the user equipment for channel switching and signal decoding when switching to a signal receiving channel and decoding, detecting a signal transmitted from the base station, so that the base station has sufficient time to switch to a signal corresponding to the user equipment, to decode uplink data transmitted from the user equipment, to determine whether correctly reception has been made according to a decoding result of the uplink data, and to transmit a corresponding HARQ feedback to the user equipment, that is, an acknowledged signal (ACK) or an unacknowledged (NACK).

If an affirmative result is obtained in step S302, that is, the acknowledged signal is received within the predetermined interval, the processing proceeds to step S303. In step S303, the user equipment stops transmission of the uplink data.

Conversely, if a negative result is obtained in step S302, that is, the acknowledged signal is not received within the predetermined interval (including the acknowledged signal (ACK) is not received or conversely the unacknowledged signal (NACK) is received), the processing proceeds to step S304. In step S304, the user equipment transmits the uplink data to the base station in a subsequent retransmission mode, until the acknowledged signal is received from the base station or a maximum retransmission times is reached. It is easy to understand that transmitting the uplink data to the base station in a subsequent retransmission mode comprises: repeatedly transmitting the uplink data to the base station with a plurality of subsequent retransmission times, wherein every time after transmitting the uplink data to the base station with one of the plurality of subsequent retransmission times, determining, within the predetermined interval, whether the acknowledged signal of the uplink data is received from the base station, and finally, transmission of the uplink data is ended when the acknowledged signal is received from the base station or the maximum retransmission times is reached.

In the first example of a data transmitting method for a user equipment according to an embodiment of the present application as shown in FIG. 3, by means of inserting, after transmitting the uplink data to the base station with the initial retransmission times, a predetermined interval to wait for determining whether the acknowledged signal of the uplink data is received from the base station, so that it is possible to stop retransmission of the uplink data in advance in the case of receiving the acknowledged signal, thereby avoiding power consumption and resource waste caused by unnecessary retransmission.

Configuration manner and indication manner of the initial retransmission times and the subsequent retransmission mode will be described below with reference to a specific acknowledgement process example.

Figure 4:
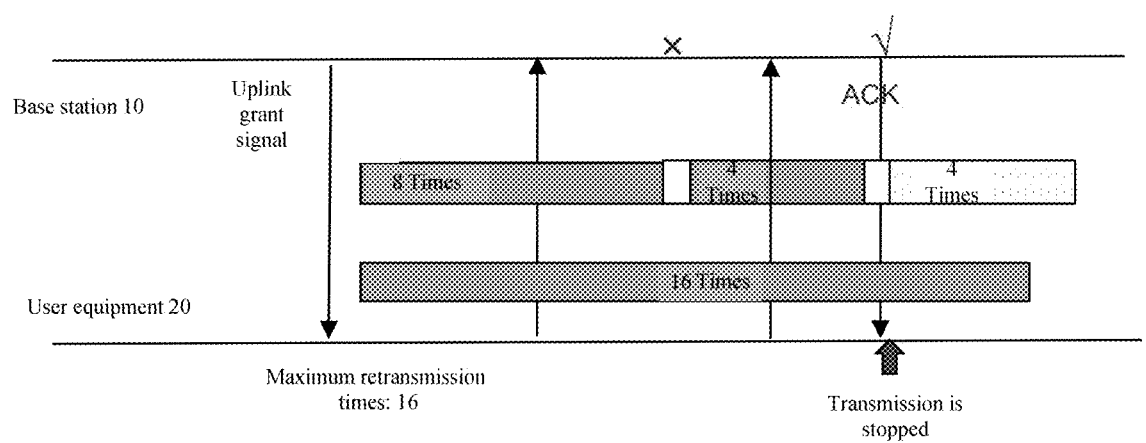
FIG. 4 is a schematic diagram illustrating a first example of early acknowledgement process of uplink data according to an embodiment of the present application.
Figure 5:
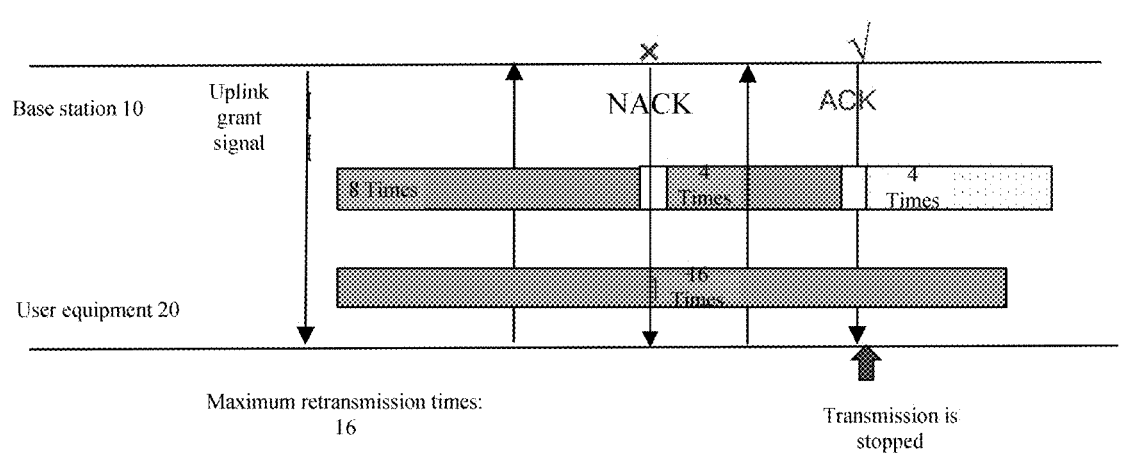
FIG. 5 is a schematic diagram illustrating a second example of early acknowledgement process of uplink data according to an embodiment of the present application.

FIGS. 4 and 5 are schematic diagrams respectively illustrating first and second examples of early acknowledgement process of uplink data according to an embodiment of the present application, FIG. 6 is a schematic diagram illustrating configuration of a retransmission mode in a data transmitting method for a user equipment according to an embodiment of the present application.

As shown in FIG. 4, the user equipment 20 starts transmission of the uplink data after receiving the uplink grant signal from the base station 10. As described above, the present application is not limited thereto, and the user equipment 20 can perform transmission of the uplink data without receiving the uplink grant signal. And, as described above, the maximum retransmission times of the uplink data is indicated to the user equipment in the uplink grant signal, or the user equipment determines the maximum retransmission times based on the measurement result of the communication with the base station. As shown in FIG. 6, the maximum retransmission times may keep to the number of times in the set of retransmission times {1, 4, 8, 16, 32 . . . 2048}, such as 1, 4, 8, 16, 32 shown in FIG. 6.

Further, as shown in FIGS. 4 and 5, in the case where the maximum retransmission times is 16 times, the user equipment 20 transmits uplink data to the base station with 8 times as the initial retransmission times.

Specifically, the initial retransmission times and the maximum retransmission times satisfy the following relationship: in the case where the maximum retransmission times is less than or equal to a predetermined threshold, the initial retransmission times is equal to the maximum retransmission times, and in the case where the maximum retransmission times is greater than a predetermined threshold, the initial retransmission times is a predetermined proportion of the maximum retransmission times. As shown in FIG. 6, the predetermined threshold is for example 4, in the case where the maximum retransmission times (1 and 4) is less than or equal to the predetermined threshold (4), the initial retransmission times is equal to the maximum retransmission times, that is, it is set to 1 or 4. In the case where the maximum retransmission times (8, 16, 32) is greater than the predetermined threshold (4), the initial retransmission times (4, 8, 16) is a predetermined proportion of the maximum retransmission times (for example, ½).

Further, as shown in FIGS. 4 and 5, after the initial retransmission times is executed, it is determined within a predetermined interval whether the acknowledged signal of the uplink data is received from the base station. FIG. 4 shows that the acknowledged signal is not received, and FIG. 5 shows that the acknowledged signal is not received but the unacknowledged signal is received. In the two situations where the acknowledged signal is not received in FIGS. 4 and 5, the user equipment continues to transmit uplink data to the base station in a subsequent retransmission mode until the acknowledged signal is received within a second predetermined interval as shown in FIGS. 4 and 5, thereby transmission of the uplink data ends earlier than the maximum retransmission times of 16 times shown in the second row of FIGS. 4 and 5.

Specifically, the plurality of subsequent retransmission times in the subsequent retransmission mode and the initial retransmission times satisfy the following relationship: each of the plurality of subsequent retransmission times is a first retransmission times mode equal to the initial retransmission times, or each of the plurality of subsequent retransmission times is a second retransmission times mode greater than or less than the initial retransmission times. As shown in FIG. 6, in the case that the maximum retransmission times is greater than a predetermined threshold, that is, in the case where there are a plurality of subsequent retransmission times, the plurality of subsequent retransmission times has a configuration 1 of equal structure and a configuration 2 of descending structure. In the configuration 1 of equal structure, the initial retransmission times and each of the plurality of subsequent retransmission times are equally configured as (4, 4), (4, 4, 4, 4) and (4, 4, 4, 4, 4, 4, 4, 4); in the configuration 2 of descending structure, the initial retransmission times and each of the plurality of subsequent retransmission times is configured in a descending way to be (8, 4, 4) and (16), 8, 8).

In an embodiment of the present application, the user equipment may switch between the first retransmission times mode and the second retransmission times mode based on an instruction from the base station. For example, one flag bit is added in, for example, downlink control information (DCI), for instructing the user equipment to perform switching between the first retransmission times mode and the second retransmission times mode.

Furthermore, in an embodiment of the present application, the length of the predetermined interval, the starting point, the time/frequency resource required for transmission, initial retransmission times, and the plurality of subsequent retransmission times may be indicated in a system information block (SIB) of the base station or in a radio resource control signaling (RRC) specific to the user equipment. Alternatively, the above parameter information may be predefined according to all of the possible maximum retransmission times (for example, the number of times in the set of retransmission times {1, 4, 8, 16, 32 . . . 2048}).

Next, a second example of a data transmitting method for a user equipment according to an embodiment of the present application will be described with reference to FIGS. 7 through 12B. In the second example of a data transmitting method for a user equipment according to an embodiment of the present application, more flexible retransmission is realized by indicating the retransmission times in the feedback received in the interval.

Figure 7:
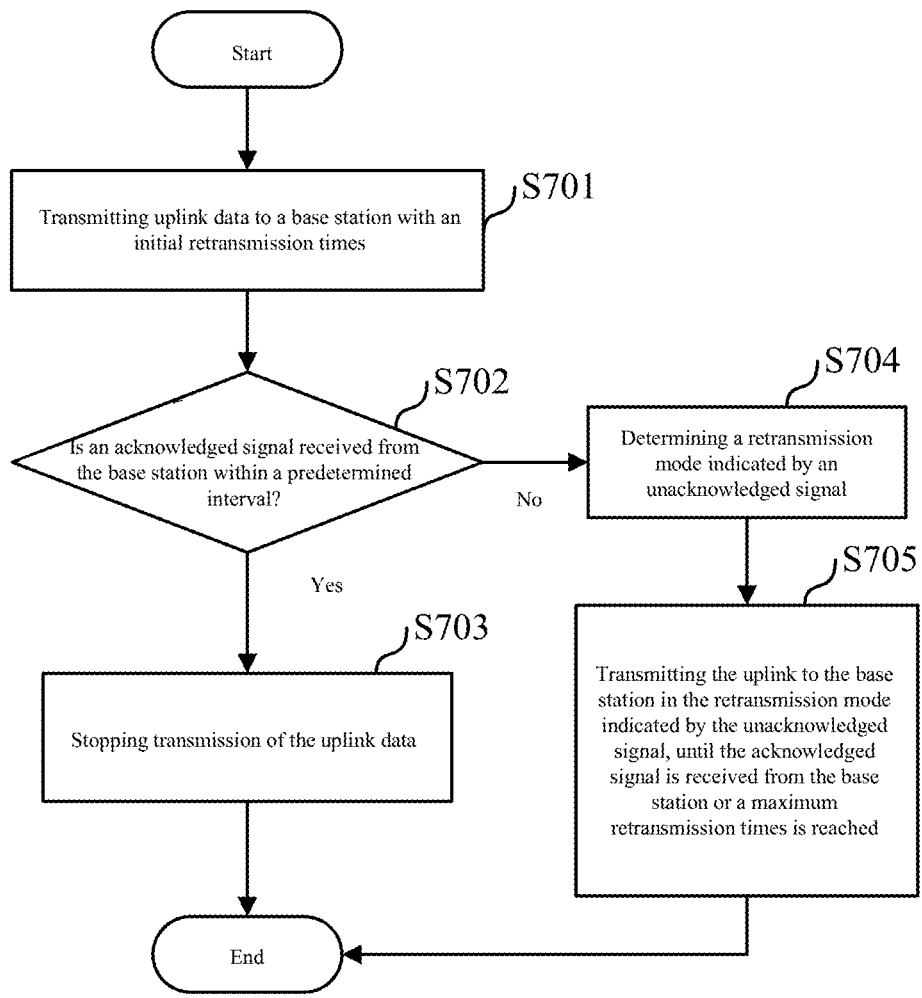
FIG. 7 is a second exemplary flowchart illustrating a data transmitting method for a user equipment according to an embodiment of the present application.

FIG. 7 is a second exemplary flowchart illustrating a data transmitting method for a user equipment according to an embodiment of the present application. As shown in FIG. 7, the second example of a data transmitting method for a user equipment according to an embodiment of the present application includes the following steps.

In step S701, uplink data is transmitted to a base station with an initial retransmission times. Step S701 shown in FIG. 7 is the same as step S301 described with reference to FIG. 3, wherein determination manners of the maximum retransmission times and the initial retransmission times are also the same, and repetitive description thereof will be omitted herein. Further, it is easily to understand that in the second example of a data transmitting method for a user equipment according to an embodiment of the present application, predetermination manner and indication manner of parameters such as the length of the predetermined interval, the starting point, the time/frequency resource required for transmission, the initial retransmission times, and the plurality of subsequent retransmission times are also the same as those in the first example of a data transmitting method for a user equipment according to an embodiment of the present application, and repetitive description thereof will be omitted herein.

Thereafter, the processing proceeds to step S702.

In step S702, it is determined, within a predetermined interval, whether an acknowledged signal for the uplink data is received from the base station. If an affirmative result is obtained in step S702, that is, the acknowledged signal is received within the predetermined interval, the processing proceeds to step S703. In step S703, the user equipment stops transmission of the uplink data.

Conversely, if a negative result is obtained in step S702, and it is confirmed that the unacknowledged signal (NACK) is received, the processing proceeds to step S704.

In step S704, a subsequent retransmission mode indicated by the unacknowledged signal is determined. In an embodiment of the present application, 2 bits may be added in the HARQ feedback (NACK) to indicate the subsequent retransmission mode. The subsequent retransmission mode may be determined by the base station based on information of the received uplink data (for example, Signal to Interference plus Noise Ratio (SINR)). In the case where the SINR of the received uplink data is high, the subsequent retransmission times of the subsequent retransmission mode can be adaptively reduced, or vice versa.

Thereafter, the processing proceeds to step S705.

In step S705, the uplink data is transmitted to the base station in the subsequent retransmission mode indicated by the unacknowledged signal, until the acknowledged signal is received from the base station or the maximum retransmission times is reached. It is easy to understand that transmitting the uplink data to the base station in the subsequent retransmission mode indicated by the unacknowledged signal comprises: repeatedly transmitting the uplink data to the base station with a plurality of subsequent retransmission times, wherein every time after transmitting the uplink data to the base station with one of the plurality of subsequent retransmission times, it is determined, within the predetermined interval, whether the acknowledged signal of the uplink data is received from the base station, if the unacknowledged signal is received, it continues to transmit the uplink data to the base station with the next retransmission times indicated by the unacknowledged signal, and finally, transmission of the uplink data is ended when the acknowledged signal is received from the base station or the maximum retransmission times is reached.

In the second example of a data transmitting method for a user equipment according to an embodiment of the present application as shown in FIG. 7, after transmitting the uplink data to the base station with the initial retransmission times, a predetermined interval is inserted to wait for determining whether an acknowledged signal of the uplink data is received from the base station, so that it is possible to stop retransmission of the uplink data in advance in the case of receiving the acknowledged signal, and to continue the retransmission of the uplink data according to the subsequent retransmission times indicated by the unacknowledged signal in the case of receiving the unacknowledged signal, thereby avoiding power consumption and resource waste caused by unnecessary retransmission.

Configuration manner and indication manner of the initial retransmission times and the subsequent retransmission mode will be further described below with reference to a specific acknowledgement process example.

Figures 8, 9:
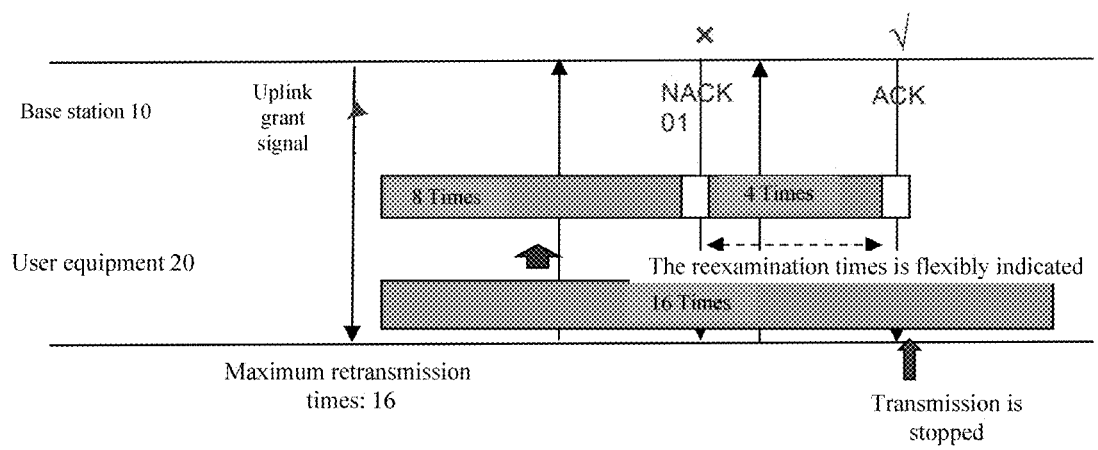
FIG. 8 is a schematic diagram illustrating configuration of an initial retransmission times in a data transmitting method for a user equipment according to an embodiment of the present application.
FIG. 9 is a schematic diagram illustrating a third example of early acknowledgement process of uplink data according to an embodiment of the present application.

FIG. 8 is a schematic diagram illustrating configuration of an initial retransmission times in a data transmitting method for a user equipment according to an embodiment of the present application; FIG. 9 is a schematic diagram illustrating a third example of early acknowledgement process of uplink data according to an embodiment of the present application; FIG. 10 is a schematic diagram illustrating configuration of a subsequent retransmission times in a data transmitting method for a user equipment according to an embodiment of the present application.

Configuration of the initial retransmission times shown in FIG. 8 is substantially the same as configuration of the initial retransmission times in the configuration of the retransmission mode of the data transmitting method for the user equipment illustrated in FIG. 6. In the case where the maximum retransmission times N is less than or equal to a predetermined threshold 4, the maximum retransmission times N is directly used as the initial retransmission times. In the case where the maximum retransmission times N is greater than a predetermined threshold 4, ½ of the maximum retransmission times N of is used as the initial retransmission times.

As shown in FIG. 9, the user equipment 20 starts transmission of the uplink data after receiving the uplink grant signal from the base station 10. As described above, the present application is not limited thereto, the user equipment 20 can perform transmission of the uplink data without receiving the uplink grant signal. In the example of FIG. 9, configuration of the initial retransmission times follows the configuration manner shown in FIG. 8, in the case where the maximum retransmission times is 16, the initial retransmission times is 8.

Further, as shown in FIG. 9, after executing the initial retransmission times, an unacknowledged signal (NACK) for the uplink data is received from the base station within a predetermined interval. The unacknowledged signal is configured with an additional 2-bit flag to indicate a subsequent retransmission mode.

FIG. 10 shows an example of a subsequent retransmission mode indicated by a 2-bit flag in a non-acknowledged signal (NACK). Specifically, in the case where the 2-bit flag takes the value "00", it indicates that the subsequent retransmission mode is configuration 1, that is, the subsequent retransmission times is $N/2^{(n-1)}$; in the case where the 2-bit flag takes the value "01", it indicates that the subsequent retransmission mode is configuration 2, that is, the subsequent retransmission times is $N/n$; in the case where the 2-bit flag takes the value of "10", the subsequent retransmission mode is indicated as configuration 3, that is, the subsequent retransmission times is $N/2^{(n)}$; in the case where the 2-bit flag takes the value "11", it indicates that the subsequent retransmission mode is configuration 4, that is, the subsequent retransmission times is $N \log_2(n+1/n)$. It is easily understood that the subsequent retransmission mode configuration illustrated in FIG. 10 is exemplary, and the present application is not limited thereto.

Further, as shown in FIG. 9, the subsequent retransmission times is indicated by the unacknowledged signal (NACK) as 4 times, and the user equipment continues to transmit the uplink data to the base station with the subsequent retransmission times flexibly indicated until the acknowledgment signal is received within the second predetermined interval as indicated in FIG. 9, so that transmission of the uplink data is ended earlier than the maximum retransmission times 16 shown in the second row of FIG. 9.

Figure 12A:
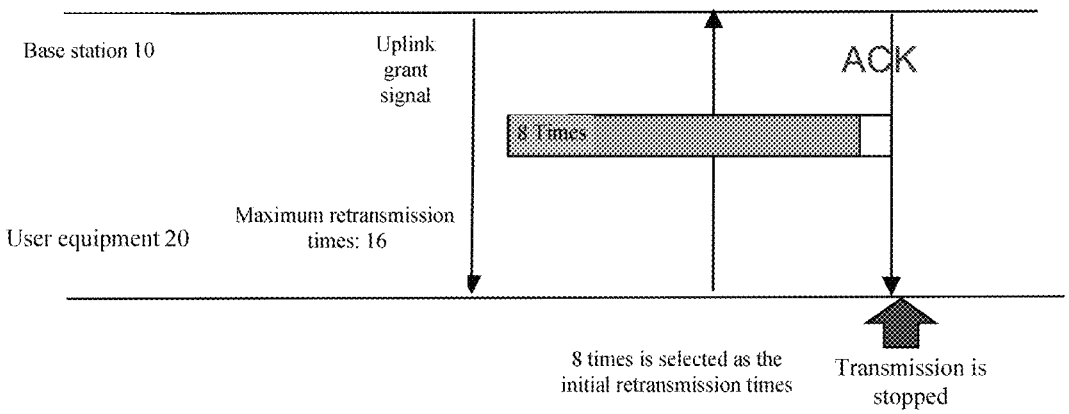
FIGS. 12A and 12B are diagrams illustrating a fourth example of early acknowledgement process of uplink data according to an embodiment of the present application.
Figure 12B:
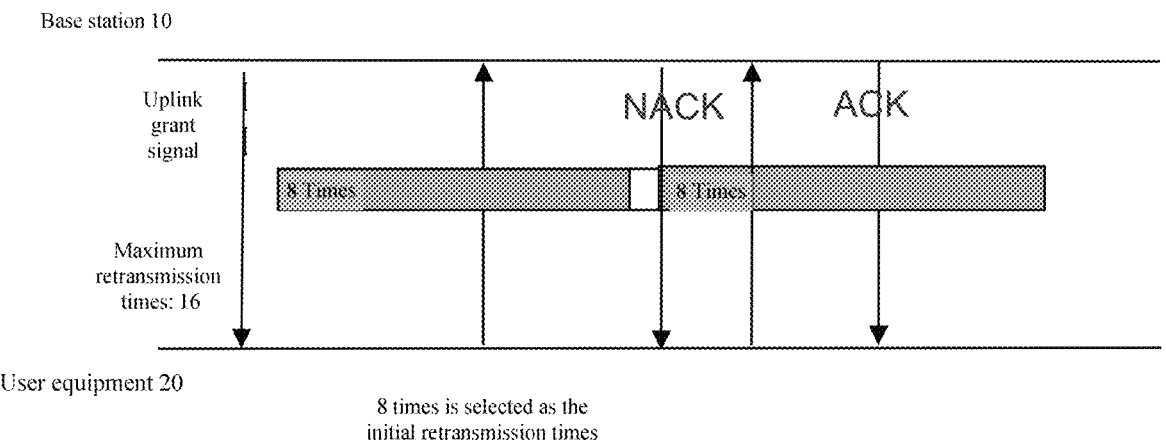

Further, the initial retransmission times and the subsequent retransmission mode according to an embodiment of the present application are not limited to the above configuration. FIG. 11 is another schematic diagram illustrating configuration of a retransmission mode in a data transmitting method for a user equipment according to an embodiment of the present application; FIGS. 12A and 12B are diagrams illustrating a fourth example of early acknowledgement process of uplink data according to an embodiment of the present application.

As shown in FIG. 11, the user equipment may select, based on the maximum retransmission times, a previous retransmission times of the maximum retransmission times, or the maximum retransmission times estimated by the user as the initial retransmission times and the subsequent retransmission times. Specifically, on the premise that the set of retransmission times is {1, 4, 8, 16, 32 . . . 2048}, regarding the situation that the retransmission times estimated for the user equipment is 8 to 16 times and the maximum retransmission times indicated by the uplink grant signal is 16 times, the previous retransmission times 8 of the maximum retransmission times 16 is selected as the initial retransmission times and the subsequent retransmission times.

FIGS. 12A and 12B show the early acknowledgement process when the initial retransmission times and the subsequent retransmission times adopt the configuration manner in FIG. 11.

As shown in FIG. 12A, in the case where the maximum retransmission times is 16, the previous retransmission times 8 with respect to 16 is selected as the initial retransmission times. After initial retransmission times 8 is executed, an acknowledged signal (ACK) transmitted from the base station is received in a predetermined interval, then transmission is stopped.

As shown in FIG. 12B, in the case where the maximum retransmission times is 16, the previous retransmission times with respect to 16 is selected as the initial retransmission times. After initial retransmission times is executed, an acknowledged signal (ACK) transmitted from the base station is not received or an unacknowledged signal (NACK) is received in the predetermined interval, then the previous retransmission times 8 with respect to 16 is continued to be selected as the subsequent retransmission times, the transmission is stopped when receiving an acknowledged signal (ACK) transmitted from the base station after performing 8 times of subsequent retransmission.

The data transmitting method for a user equipment according to an embodiment of the present application has been described above with reference to the accompanying drawings, next, the corresponding data receiving method for a base station according to an embodiment of the present application will be further described below.

Figure 13:
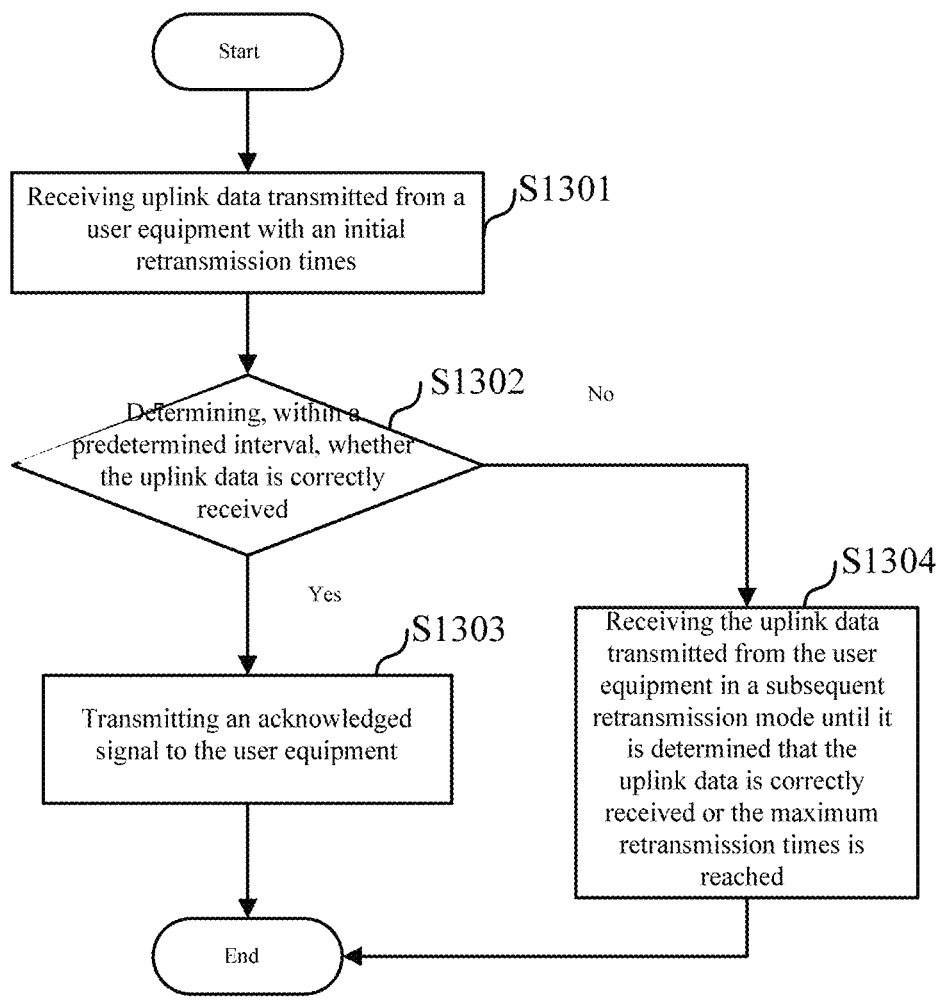
FIG. 13 is a flowchart illustrating an example of a data receiving method for a base station according to an embodiment of the present application.

FIG. 13 is a flowchart illustrating an example of a data receiving method for a base station according to an embodiment of the present application. As shown in FIG. 13, a data receiving method for a base station according to an embodiment of the present application comprises the following steps.

In step S1301, uplink data transmitted from a user equipment with an initial retransmission times is received. It is easy to understand that in an embodiment of the present application, the user equipment may start to transmit the uplink data with the initial retransmission times after receiving an uplink grant signal (UL grant) from the base station. Alternatively, the user equipment may transmit the uplink data to the base station without receiving an uplink grant signal.

Further, as described above, before receiving the uplink data transmitted from the user equipment with the initial retransmission times, it is necessary to determine the maximum retransmission times of the uplink data. The base station may indicate, to the user equipment, the maximum retransmission times of the uplink data in the uplink grant signal. Alternatively, the user equipment determines the maximum retransmission times based on a measurement result of communication with the base station. Further, the initial retransmission times may adopt the configuration described with reference to FIGS. 6 and 8, and repetitive description thereof will be omitted herein.

Thereafter, the processing proceeds to step S1302.

In step S1302, it is determined, within a predetermined interval, whether the uplink data is correctly received from the user equipment. In an embodiment of the present application, relevant parameter configuration of the predetermined interval may adopt a manner as described above, that is, a length of the predetermined interval corresponds the time (for example, 3 ms) required by the user equipment for channel switching and signal decoding when switching to a signal receiving channel and decoding, detecting a signal transmitted from the base station, so that the base station has sufficient time to switch to a signal corresponding to the user equipment, to decode uplink data transmitted from the user equipment, to determine whether correct reception has been made according to a decoding result of the uplink data, and to transmit a corresponding HARQ feedback to the user equipment, that is, an acknowledged signal (ACK) or an unacknowledged (NACK). Furthermore, the length of the predetermined interval, the starting point, the time/frequency resource required for transmission, the initial retransmission times, and the plurality of subsequent retransmission times may be indicated in a system information block (SIB) of the base station or in a radio resource control signaling (RRC) specific to the user equipment. Alternatively, the above parameter information may be predefined according to all of the maximum retransmission times possibilities (for example, the number of times in the set of retransmission times {1, 4, 8, 16, 32 . . . 2048}).

If an affirmative result is obtained in step S1302, that is, the uplink data is correctly received from the user equipment, the processing proceeds to step S1303. In step S1303, an acknowledged signal is transmitted to the user equipment.

Conversely, if a negative result is obtained in step S1302, that is, the uplink data is not correctly received from the user equipment, the processing proceeds to step S1304. In step S1304, the uplink data transmitted from the user equipment in a subsequent retransmission mode is received until it is determined that the uplink data is correctly received or the maximum retransmission times is reached. Further, although not shown in FIG. 13, it is easily to understand that if a negative result is obtained in step S1302, the base station can transmit an unacknowledged signal to the user equipment. Further, the base station may generate the acknowledged signal and the unacknowledged signal based on the received information of the uplink data, and the unacknowledged signal can be used to indicate the subsequent retransmission mode of the user equipment. Regarding configuration of the subsequent retransmission mode, the configuration manners described with reference to FIGS. 6, 10, and 11 may be employed, and repetitive description thereof will be omitted herein.

Hereinafter, the user equipment and the base station that execute the above-described data transmitting method and data receiving method will be further described separately with reference to FIGS. 14 and 15.

Figure 14:
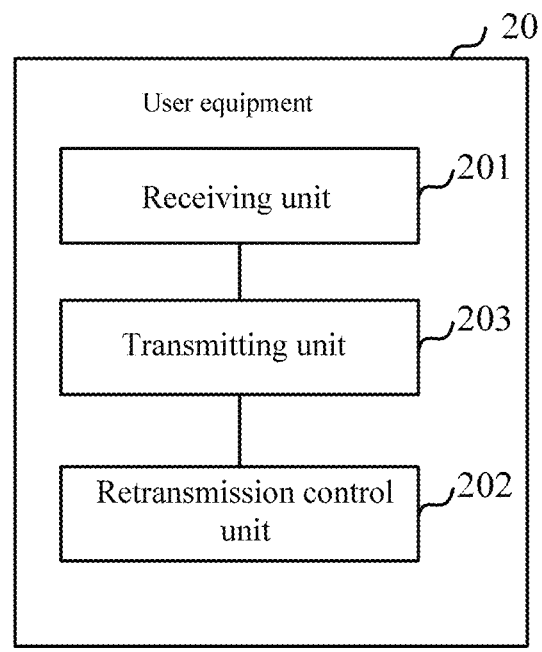
FIG. 14 is a block diagram illustrating a user equipment according to an embodiment of the present application.

FIG. 14 is a block diagram illustrating a user equipment according to an embodiment of the present application. As shown in FIG. 14, the user equipment 20 according to an embodiment of the present application comprises a receiving unit 201, a transmitting unit 202, and a retransmission control unit 203.

Specifically, the receiving unit 201 is configured to receive a signal from a base station 10. The transmitting unit 202 is configured to transmit uplink data to the base station 10 with an initial retransmission times. The retransmission control unit 203 is configured to determine, within a predetermined interval, whether an acknowledged signal of the uplink data is received from the base station 10. In the case where the acknowledged signal is received within the predetermined interval, the retransmission control unit 203 controls the transmitting unit 202 to stop transmission of the uplink data; and in the case where the acknowledged signal is not received within the predetermined interval, the retransmission control unit 203 controls the transmitting unit 202 to transmit the uplink data to the base station 10 in a subsequent retransmission mode until the acknowledged signal is received from the base station 10 or the maximum retransmission times is reached.

Further, the retransmission control unit 203 is further configured to determine the maximum retransmission times of the uplink data before transmitting the uplink data to the base station 10 with the initial retransmission times. As described above, the uplink grant signal received from the base station 10 via the receiving unit 201 indicates to the user equipment 20 the maximum retransmission times of the uplink data. Alternatively, the maximum retransmission times is determined based on a measurement result of communication between the user equipment 20 and the base station 1010.

Further, in the case where the acknowledged signal is not received within the predetermined interval, the retransmission control unit 203 controls the transmitting unit 201 to repeatedly transmit the uplink data to the base station 10 with a plurality of subsequent retransmission times. Every time after transmitting the uplink data to the base station 10 with one of the plurality of subsequent retransmission times, the retransmission control unit 203 determines, within the predetermined interval, whether the acknowledged signal of the uplink data is received from the base station 10.

Furthermore, in the case where an unacknowledged signal is received within the predetermined interval, the retransmission control unit 203 controls the transmitting unit 201 to transmit the uplink data to the base station 10 in a subsequent retransmission mode until the acknowledged signal is received from base station 10 or the maximum retransmission times is reached.

Alternatively, in the case where an unacknowledged signal is received within the predetermined interval, the retransmission control unit 203 determines the subsequent retransmission mode indicated by the unacknowledged signal, and controls the transmitting unit 201 to transmit the uplink data to the base station 10 in the subsequent retransmission mode indicated by the unacknowledged signal, until the acknowledged signal is received from the base station 10 or the maximum retransmission times is reached.

In addition, the retransmission control unit 203 may select, based on the maximum retransmission times, according to the maximum retransmission times, a previous retransmission times of the maximum retransmission times as the initial retransmission times and the subsequent retransmission times. The receiving unit 201 receives the acknowledged signal and the unacknowledged signal over the same channel as that for the uplink grant signal or in a downlink control information format or in a predetermined physical channel.

In addition, configuration of the maximum retransmission times, the initial retransmission times, the subsequent retransmission mode, and the predetermined interval may adopt the configuration described above, and repeated description thereof will be omitted herein.

Figure 15:
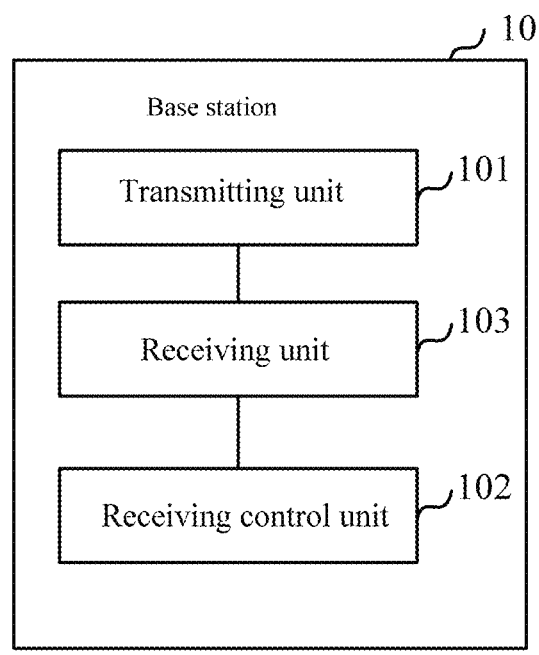
FIG. 15 is a block diagram illustrating a base station according to an embodiment of the present application.

FIG. 15 is a block diagram illustrating a base station according to an embodiment of the present application. As shown in FIG. 15, a base station 10 according to an embodiment of the present application comprises a transmitting unit 101, a receiving unit 102, and a receiving control unit 103.

Specifically, the transmitting unit 101 is configured to transmit a signal to a user equipment 20. The receiving unit 102 is configured to receive uplink data transmitted from the user equipment 20 with an initial retransmission times. The receiving control unit 103 is configured to determine, within a predetermined interval, whether the uplink data is correctly received from the user equipment 20, and in the case where it is determined that the uplink data is correctly received, the receiving control unit 103 controls the transmitting unit 101 to transmit an acknowledged signal to the user equipment 20.

Further, before receiving the uplink data from the user equipment 20, the maximum retransmission times of the uplink data is determined. The base station 10 can transmit an uplink grant signal to the user equipment 20 through the transmitting unit 101 so as to indicate the maximum retransmission times of the uplink data. Alternatively, the user equipment 20 determines the maximum retransmission times based on a measurement result of communication with the base station 10.

Further, in the case where it is determined that the uplink data is not correctly received, the reception control unit 103 controls the transmission unit 101 to transmit an unacknowledged signal to the user equipment 20. The receiving control unit 103 generates the acknowledged signal and the unacknowledged signal based on the received information of the uplink data, and the unacknowledged signal can be used to indicate the subsequent retransmission mode of the user equipment.

Further, in the case where it is determined that the uplink data is not correctly received, the receiving unit 103 receives uplink data transmitted from the user equipment 20 in a subsequent retransmission mode until the reception control unit 103 determines that the uplink data is received correctly or the maximum retransmission times is reached.

Further, a length of the predetermined interval corresponds to the time required for channel switching and signal decoding when the base station 10 receives the uplink data, and the transmitting unit 103 indicates, through the system information block or the radio resource control signaling of the user equipment 20, the length of the predetermined interval, the initial retransmission times, and the plurality of subsequent retransmission times, or the length of the predetermined interval, the initial retransmission times, and the plurality of subsequent retransmission times are predetermined with respect to the maximum retransmission times.

In addition, configuration of the maximum retransmission times, the initial retransmission times, the subsequent retransmission mode, and the predetermined interval may adopt the configuration described above, and repeated description thereof will be omitted herein.

The block diagrams used in the above description of the foregoing embodiment illustrate blocks of functional units. The functional blocks (constituent elements) are realized by any combination of hardware and/or software. In addition, means for realizing each functional block is not specifically limited. That is, each functional block may be realized by one apparatus in which the functional blocks are combined physically and/or logically or may be realized by two or more apparatuses that are physically and/or logically separated by connecting the plurality of apparatuses directly and/or indirectly (for example, in a wired and/or wireless manner).

Figure 16:
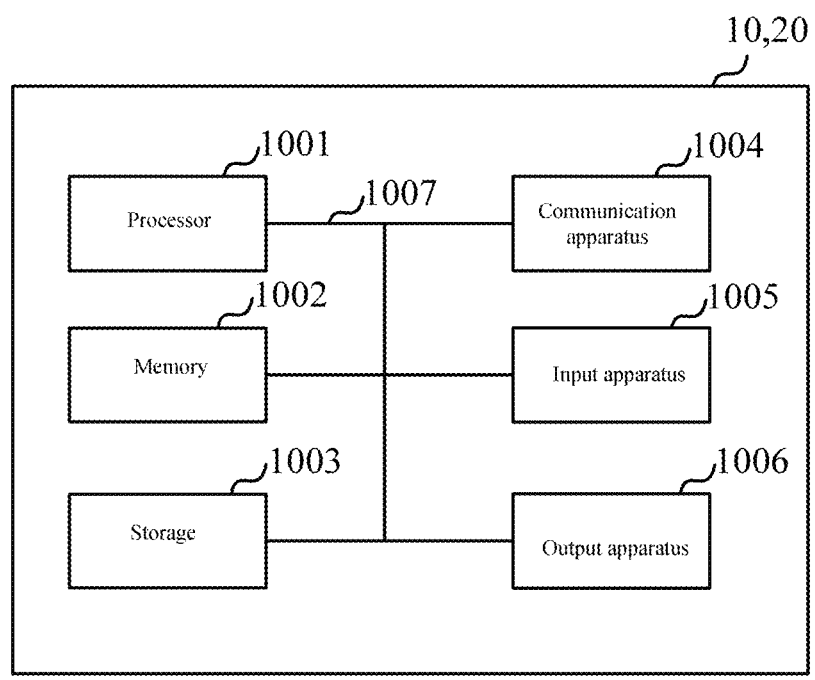
FIG. 16 is a block diagram illustrating an example of hardware configuration of a base station and a user equipment according to an embodiment of the present application.

For example, the base station and the mobile station according to an embodiment of the present application may function as a computer that performs processes of a wireless communication method according to the present application. FIG. 16 is a block diagram illustrating an example of a hardware configuration of the base station and the mobile station according to an embodiment of the present application. The base station 10 and the user equipment 20 described above may be physically configured as a computer apparatus that includes a processor 1001, a memory 1002, a storage 1003, a communication apparatus 1004, an input apparatus 1005, an output apparatus 1006, and a bus 1007 or the like.

In addition, in the following description, a term "apparatus" can be replaced with a circuit, a device, a unit, or the like. The hardware configuration of the base station 10 and the user equipment 20 may be configured to include one apparatus or a plurality of apparatuses illustrated in the drawing or may be configured not to include some of the apparatuses.

For example, the processor 1001 only illustrates one, but may be a plurality of processors. In addition, the processing may be performed by one processor, or may be performed by one or more processors simultaneously, sequentially, or by other methods. Additionally, the processor 1001 can be installed by more than one chip.

The functions of the base station 10 and the user equipment 20 are realized by the following manners: reading predetermined software (program) on hardware such as the processor 1001 or the memory 1002 so that the processor 1001 can perform an arithmetic operation and by controlling communication by the communication apparatus 1004 and reading and/or writing of data in the memory 1002 and the storage 1003.

For example, the processor 1001 controls the entire computer by operating an operating system. The processor 1001 may be also configured as a central processing unit (CPU) that includes an interface with a peripheral apparatus, a control apparatus, an arithmetic apparatus, a register, and the like. For example, the receiving control unit 103 and the retransmission control unit 203 may be realized by the processor 1001.

In addition, the processor 1001 reads a program (program codes), a software module, data and so on from the storage 1003 and/or the communication apparatus 1004 to the memory 1002 and performs various processes according to the program, the software module, or the data. As the program, a program causing a computer to perform at least some of the operations described in the foregoing embodiment is used. For example, the retransmission control unit 203 of the user equipment 20 may be stored in the memory 1002 and realized by a control program that is operated by the processor 1001. Another functional block may be similarly realized. The memory 1002 is a computer-readable recording medium and may be configured by at least one of, for example, a read-only memory (ROM), an erasable programmable ROM (EPROM), an electrically erasable programmable ROM (EEPROM), and a random access memory (RAM), and other proper storage mediums. The memory 1002 may also be referred to as a register, a cache, a main memory (main storage apparatus), or the like. The memory 1002 can store a program (program codes), a software module, or the like which can be executed to perform an information transmission method and a wireless communication method according to an embodiment of the present application.

The storage 1003 is a computer-readable recording medium and may be configured by at least one of, for example, a flexible disk, a floppy (registered trademark) disk, a magneto-optical disk (for example, a Compact Disc ROM (CD-ROM), etc.), a digital versatile disc, a Blu-ray (registered trademark) disc, a removable disk, a hard disk drive, a smart card, a flash memory (for example, a card, a stick, or a key drive), a magnetic strip, a database, a server, and another appropriate medium. The storage 1003 may be also referred to as an auxiliary storage apparatus.

The communication apparatus 1004 is hardware (a transmission and reception device) that performs communication between computers via a wired and/or wireless network and is also referred to as, for example, a network device, a network controller, a network card, or a communication module. The communication apparatus 1004 may include a high frequency switch, a duplexer, a filter, a frequency synthesizer, etc., in order to implement, for example, Frequency Division Duplex (FDD) and/or Time Division Duplex (TDD). For example, the transmitting unit 101, the receiving unit 102, the receiving unit 201, and the transmitting unit 202 described above may be realized by the communication apparatus 1004.

The input apparatus 1005 is an input device (for example, a keyboard, a mouse, a microphone, a switch, a button, or a sensor) that receives an input from the outside. The output apparatus 1006 is an output device (for example, a display, a speaker, or an LED lamp) that performs an output to the outside. The input apparatus 1005 and the output apparatus 1006 may be configured to be integrated (for example, a touch panel).

In addition, the apparatuses such as the processor 1001 and the memory 1002 are connected to the bus 1007 for communicating information. The bus 1007 may be configured as a single bus or may be configured by different buses between the apparatuses.

In addition, the base station 10 and the user equipment 20 may be configured to include hardware such as a microprocessor, a digital signal processor (DSP), an application specific integrated circuit (ASIC), a programmable logic device (PLD), a field programmable gate array (FPGA), or some or all of the functional blocks may be realized by the hardware. For example, the processor 1001 may be implemented in at least one of the hardware.

The data transmitting method, the data receiving method, the user equipment, and the base station according to the embodiments of the present application have been described with reference to FIGS. 1 through 16, by means of inserting an interval for detecting HARQ feedback from the base station in the large uplink data retransmission times, early acknowledgement of uplink data reception is implemented without fully performing the maximum retransmission times that is designated or estimated in advance, thereby saving power consumption of user equipment, improving resource utilization efficiency, and improving scheduling flexibility.

In addition, the terms described in this specification and/or terms necessary to understand this specification may be replaced with terms that have same or similar meanings. For example, a channel and/or a symbol may be a signal. In addition, a signal may be also a message. A reference signal may also be simply referred to as RS (Reference Signal), and may also be called pilot, pilot signal, etc. according to applicable standards. In addition, a component carrier (CC) may also be referred to as a cell, a frequency carrier, a carrier frequency, or the like.

In addition, the information, the parameter, or the like described in this specification may be represented by an absolute value, may be also represented by a relative value from a predetermined value, or may be also represented by another piece of corresponding information. For example, a radio resource may be indicated using an index. Further, the formula or the like using these parameters may be different from those explicitly disclosed in this specification.

The names used for the above-described parameters are not limited in any respect. For example, various channels (Physical Uplink Control Channel (PUCCH), Physical Downlink Control Channel (PDCCH), or the like) and information elements can be identified with any appropriate names, thus various names allocated to the various channels and information elements are not limited in any respect.

The information, the signal, and the like described in this specification may be represented using any of various technologies. For example, the data, the order, the command, the information, the signal, the bit, the symbol, the chip, and the like mentioned throughout the foregoing description may be represented by a voltage, a current, an electromagnetic wave, a magnetic field, or a magnetic particle, an optical field or a photon, or any combination thereof.

In addition, information or the like can be output from a higher layer to a lower layer and/or from a lower layer to a higher layer). Information or the like may be input or output via a plurality of network nodes.

The input or output information, signal, or the like may be stored in a specific location (for example, a memory) or may be managed with a management table. The input or output information, signal, or the like may be overwritten, updated, or edited. The output information, signal, or the like may be deleted. The input information, signal or the like may be transmitted to another apparatus.

The notification of information is not limited to the aspects/embodiments described in this specification and may be performed in accordance with other methods. For example, the notification of information may be performed with physical layer signaling (for example, downlink control information (DCI), uplink control information (UCI)), higher layer signaling (for example, radio resource control (RRC) signaling, broadcast information (master information block (MIB), a system information block (SIB) or the like), medium access control (MAC) signaling, or another signal, or a combination thereof.

Further, the physical layer signaling may be referred to as L1/L2 (Layer 1/Layer 2) control information (L1/L2 control signal), L1 control information (L1 control signal), and the like. In addition, The RRC signaling may be referred to as an RRC message or may be, for example, an RRC connection setup message or an RRC connection reconfiguration message. Furthermore, the MAC signaling can be notified, for example, by a MAC Control Unit (MAC CE).

In addition, notification of predetermined information (for example, notification of "ACK", "NACK") is not limited to being performed explicitly and may be performed implicitly (for example, the notification of the predetermined information is not performed, the notification of other information is performed).

Determination may be made based on a value (0 or 1) represented by 1 bit, may be made based on a true or false value (boolean value) represented by true or false, or may be made based on comparison with a numerical value (for example, comparison with a predetermined value).

Regardless of the fact that software is referred to as software, firmware, middleware, a microcode, or a hardware description language or is referred to as another name, the software is broadly interpreted to mean a command, a command set, a code, a code segment, a program code, a program, a sub-program, a software module, an application, a software application, a software package, a routine, a subroutine, an object, an executable file, an execution thread, a procedure, a function, or the like.

In addition, software, a command, information, or the like may be transmitted or received via a transmission medium. For example, when software is transmitted from a website, a server, or another remote source using a wired technology such as a coaxial cable, an optical cable, a twisted pair, and a digital subscriber line (DSL) and/or a wireless technology such as an infrared ray, radio, and microwaves, the wired technology and/or the wireless technology is included in the definition of a transmission medium.

The terms "system" and "network" used in this specification are interchangeably used.

In this specification, the terms "base station", "wireless station", "eNB", "gNB" "cell", "sector" "cell group", "carrier", and "component carrier" can be interchangeably used in this specification. A base station can be also referred to as the term such as a fixed station, a NodeB, an eNodeB (eNB), an access point, a transmission point, a reception point, a femtocell, or a small cell.

A base station can accommodate one or more (for example, three) cells (also referred to as "sectors"). When a base station accommodates a plurality of cells, the entire coverage area of the base station can be divided into a plurality of smaller areas and a communication service can be also provided in each of the smaller areas using a base station subsystem (for example, an indoor small-sized base station remote radio head (RRH)). The term "cell" or "sector" refers to a part or all of a coverage area of a base station and/or a base station subsystem that provides a communication service in the coverage area.

In this specification, terms such as "mobile station (MS)", "user terminal", "user equipment (UE)", and "terminal" are used interchangeably. The base station is sometimes referred to by a fixed station, a NodeB, an eNodeB (eNB), an access point, a transmission point, a reception point, a femto cell, a small cell, and the like.

A mobile station is referred to as a subscriber station, a mobile unit, a subscriber unit, a radio unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or several other appropriate terms by those skilled in the art.

In addition, the wireless base station in this specification can also be replaced with a user terminal. For example, each mode/embodiment of the present application can be applied to a configuration in which communication between a radio base station and a user terminal is replaced with communication between a plurality of user-to-device (D2D) devices. At this time, the function of the above-described wireless base station 10 can be regarded as a function of the user terminal 20. In addition, words such as "uplink" and "downlink" can also be replaced with "side". For example, the uplink channel can also be replaced with a side channel.

Similarly, the user terminal in this specification can also be replaced with a wireless base station. At this time, the function of the user terminal 20 described above can be regarded as a function of the wireless base station 10.

In this specification, a specific operation performed by the base station may be also performed by an upper node. In a network formed by one or more network nodes including a base station, it should be apparent that various operations performed for inter-terminal communicate may be performed by a base station, one or more network nodes (for example, a Mobility Management Entity (MME), a Serving-Gateway (S-GW) may be considered, but the present application is not limited thereto) other than the base station, or a combination thereof.

The aspects/embodiments described in this specification may be individually used, may be combined, or may be switched during execution. In addition, the order of the process procedure, the sequence, the flowchart, or the like of each aspect/embodiment described in this specification may be interchanged unless there is contradiction. For example, in the method described in this specification, various steps have been proposed in exemplary orders and the present application is not limited to the proposed specific orders.

Each aspect/embodiment described in this specification may be applied to a system in which Long Term Evolution (LTE), LTE-Advanced (LTE-A), LTE-Beyond (LTE-B), Super 3rd Generation Mobile Communication System (SUPER 3G), Advanced International Mobile Telecommunications (IMT-Advanced), 4th generation mobile communication system (4G), 5th generation mobile communication system (5G), Future Radio Access (FRA), New-RAT (Radio Access Technology), New Radio (NR), New Radio Access (NX), Future generation radio Access (FX), Global System for Mobile Communications (GSM (registered trademark)), Code Division Multiple Access 2000 (CDMA2000), Ultra Mobile Broadband (UMB), IEEE 802.11 (Wi-Fi (Registered trademark)), IEEE 802.16 (WiMAX (registered trademark)), IEEE 802.20, Ultra-WideBand (UWB), Bluetooth (registered trademark) and other appropriate systems are used and/or a next generation system extended based on the system.

The description "based on" used in this specification does not imply "based only on" unless otherwise specified. In other words, the description of "based on" implies both of "based only on" and "based at least on."

When reference is made to elements in which names "first," "second," and the like are used in this specification, the number or the order of the elements is not generally limited. The names can be used in this specification as a method to conveniently distinguish two or more elements from each other. Accordingly, reference to first and second elements does not imply that only two elements are employed or the first element is prior to the second element in some ways.

The term "determining" used in this specification may include a wide variety of operations. Regarding the "determining," for example, calculating, computing, processing, deriving, investigating, looking up (for example, looking up in a table, a database, or another data structure), and ascertaining may be considered as "determining." In addition, regarding the "determining," for example, receiving (for example, receiving information), transmitting (for example, transmitting information), inputting, outputting, and accessing (for example, accessing data in a memory) may be considered as "determining". In addition, regarding the "determining," for example, resolving, selecting, choosing, establishing, and comparing may be considered as "determining". That is, the "determining" can include a case in which any operation is "determined."

The term "connected" or "coupled" or any modification of the term means various types of direct or indirect connection or coupling between two or more elements and can include the presence of one or more intermediate elements between two mutually "connected" or "coupled" elements. The connection or the coupling between elements may be physical connection, logical connection, or any combination thereof. For example, "connection" can also be replaced with "access to". When the connection or the coupling is used in this specification, two elements can be considered to be mutually "connected" or "coupled" by using one or more electric wires, cables, and/or printed electric connection and using electromagnetic energy such as electromagnetic energy with a wavelength of a radio frequency region, a microwave region, and a light (both visible light and invisible light) region as several non-limited and non-inclusive examples.

The terms "including" and "comprising" are intended to be inclusive as in the term "comprise" as long as "including," "comprising," and modifications thereof are used in this specification or the claims. Further, the term "or" used in this specification or the claims is intended not to be exclusive OR.

The present application has been described above in detail, but it is obvious to those skilled in the art that the present application is not limited to the embodiments described in the specification. The present application can be implemented as a modification and modification without departing from the spirit and scope of the present application as defined by the appended claims. Accordingly, the description of the specification is intended to be illustrative, and is not intended to limit the present application.

What is claimed is:

1. A data transmitting method for a user equipment, comprising:
    transmitting uplink data to a base station with an initial retransmission times; and
    determining, within a predetermined interval, whether an acknowledged signal of the uplink data is received from the base station,
    wherein
    in the case where the acknowledged signal is not received within the predetermined interval, the uplink data is transmitted to the base station in a subsequent retransmission mode, until the acknowledged signal is received from the base station or a maximum retransmission times is reached, and wherein:
    the uplink data being transmitted to the base station in a subsequent retransmission mode comprises repeatedly transmitting the uplink data to the base station with a plurality of subsequent retransmission times,
    a length of the predetermined interval corresponds to the time required by the user equipment for channel switching and signal decoding, and
    the length of the predetermined interval, the initial retransmission times, and the plurality of subsequent retransmission times are indicated in a system information block of the base station or a radio resource control signaling of the user equipment, or are predetermined according to all of the possible maximum retransmission times.

2. The data transmitting method according to claim 1, further comprising:
    before transmitting uplink data to the base station with an initial retransmission times, determining a maximum retransmission times of the uplink data,
    wherein an uplink grant signal received from the base station indicates, to the user equipment, the maximum retransmission times of the uplink data; or
    the user equipment determines the maximum retransmission times based on a measurement result of communication with the base station.

3. The data transmitting method according to claim 2, wherein
    in the case where the maximum retransmission times is less than or equal to a predetermined threshold, the initial retransmission times is equal to the maximum retransmission times, and
    in the case where the maximum retransmission times is greater than a predetermined threshold, the initial retransmission times is a predetermined proportion of the maximum retransmission times.

4. The data transmitting method according to claim 1, wherein every time after transmitting the uplink data to the base station with one of the plurality of subsequent retransmission times, determining, within the predetermined interval, whether the acknowledged signal of the uplink data is received from the base station.

5. The data transmitting method according to claim 4, wherein a previous retransmission times of the maximum retransmission times is selected, based on the maximum retransmission times, as the initial retransmission times and the subsequent retransmission times.

6. The data transmitting method according to claim 4, wherein
    each of the plurality of subsequent retransmission times is a first retransmission times mode equal to the initial retransmission times, or each of the plurality of subsequent retransmission times is a second retransmission times mode greater than or less than the initial retransmission times, and
    switching between the first retransmission times mode and the second retransmission times mode is performed based on an instruction from the base station.

7. The data transmitting method according to claim 1, further comprising:
    in the case where an unacknowledged signal is received within the predetermined interval, the uplink data is transmitted to the base station in a subsequent retransmission mode, until the acknowledged signal is received from the base station, or the maximum retransmission times is reached.

8. The data transmitting method according to claim 1, further comprising:
in the case where an unacknowledged signal is received within the predetermined interval, determining a subsequent retransmission mode indicated by the unacknowledged signal, and
transmitting the uplink data to the base station in the subsequent retransmission mode indicated by the unacknowledged signal, until the acknowledged signal is received from the base station or the maximum retransmission times is reached.

9. The data transmitting method according to claim 1, wherein an acknowledged signal and an unacknowledged signal are generated by the base station based on the received information of the uplink data, the acknowledged signal and the unacknowledged signal are transmitted over the same channel as that for an uplink grant signal or in a downlink control information format or in a predetermined physical channel.

10. A data receiving method for a base station, comprising:
receiving uplink data transmitted from a user equipment with an initial retransmission times; and
determining, within a predetermined interval, whether the uplink data is received correctly from the user equipment,
wherein in the case where the uplink data is not received correctly from the user equipment, the uplink data transmitted from the user equipment in a subsequent retransmission mode is received until it is determined that the uplink data is correctly received or a maximum retransmission times is reached, and
wherein:
the uplink data transmitted from the user equipment in a subsequent retransmission mode being received comprises receiving the uplink data repeatedly transmitted from the user equipment with a plurality of subsequent retransmission times,
a length of the predetermined interval corresponds to the time required by the user equipment for channel switching and signal decoding, and
the length of the predetermined interval, the initial retransmission times, and the plurality of subsequent retransmission times are indicated in a system information block of the base station or a radio resource control signaling of the user equipment, or are predetermined according to all of the possible maximum retransmission times.

11. A user equipment, comprising:
a receiving unit, configured to receive a signal from a base station;
a transmitting unit, configured to transmit uplink data to the base station with an initial retransmission times; and
a retransmission control unit, configured to determine, within a predetermined interval, whether an acknowledged signal of the uplink data is received from the base station,
wherein
in the case where the acknowledged signal is not received within the predetermined interval, the retransmission control unit controls the transmitting unit to transmit the uplink data to the base station in a subsequent retransmission mode, until the acknowledged signal is received from the base station or a maximum retransmission times is reached, and wherein:
the retransmission control unit controlling the transmitting unit to transmit the uplink data to the base station in a subsequent retransmission mode comprises the retransmission control unit controlling the transmitting unit to repeatedly transmit the uplink data to the base station with a plurality of subsequent retransmission times,
a length of the predetermined interval corresponds to the time required by the user equipment for channel switching and signal decoding, and
the length of the predetermined interval, the initial retransmission times, and the plurality of subsequent retransmission times are indicated in a system information block of the base station or a radio resource control signaling of the user equipment, or are predetermined according to all of the possible maximum retransmission times.

12. The user equipment according to claim 11, wherein the retransmission control unit is further configured to determine, before transmitting uplink data to the base station with an initial retransmission times, a maximum retransmission times of the uplink data,
wherein an uplink grant signal received from the base station by the receiving unit indicates, to the user equipment, the maximum retransmission times of the uplink data; or
the maximum retransmission times is determined based on a measurement result of communication with the base station.

13. The user equipment according to claim 12, wherein the receiving unit receives the acknowledged signal and the unacknowledged signal over the same channel as that for the uplink grant signal or in a downlink control information format or in a predetermined physical channel.

14. The user equipment according to claim 11,
wherein every time after transmitting the uplink data to the base station with one of the plurality of subsequent retransmission times, the retransmission control unit determines, within the predetermined interval, whether the acknowledged signal of the uplink data is received from the base station.

15. The user equipment according to claim 14, wherein the receiving unit receives the acknowledged signal and the unacknowledged signal over the same channel as that for the uplink grant signal or in a downlink control information format or in a predetermined physical channel.

16. The user equipment according to claim 11, wherein in the case where an unacknowledged signal is received within the predetermined interval, the retransmission control unit controls the transmitting unit to transmit the uplink data to the base station in a subsequent retransmission mode, until the acknowledgement signal is received from the base station or the maximum retransmission times is reached.

17. The user equipment according to claim 11, wherein in the case where an unacknowledged signal is received within the predetermined interval, the retransmission control unit determines a subsequent retransmission mode indicated by the unacknowledged signal, and controls the transmitting unit to transmit the uplink data to the base station in the subsequent retransmission mode indicated by the unacknowledged signal, until the acknowledged signal is received from the base station or the maximum retransmission times is reached.

18. The user equipment according to claim 11, wherein the retransmission control unit selects, based on the maximum retransmission times, a previous retransmission times of the maximum retransmission times as the initial retransmission times and the subsequent retransmission times.

19. The user equipment according to claim 11, wherein the receiving unit receives the acknowledged signal and the unacknowledged signal over the same channel as that for the uplink grant signal or in a downlink control information format or in a predetermined physical channel.

* * * * *